United States Patent [19]
Akagi et al.

[11] Patent Number: 5,946,416
[45] Date of Patent: Aug. 31, 1999

[54] IMAGE PROCESSING DEVICE AND METHOD FOR DETECTING AND REMOVING FINE LINES IN AN IMAGE PATTERN

[75] Inventors: Masahiro Akagi, Muko; Koichi Ohmae; Shinya Sonoda, both of Kyoto; Masahito Yanagida, Nagaokakyo, all of Japan

[73] Assignee: Omron Corporation, Kyoto, Japan

[21] Appl. No.: 08/609,741

[22] Filed: Mar. 1, 1996

[30] Foreign Application Priority Data

Mar. 1, 1995 [JP] Japan .................................. 7-065303

[51] Int. Cl.$^6$ ...................................................... G06K 9/36
[52] U.S. Cl. .......................... 382/194; 382/202; 382/254
[58] Field of Search ...................................... 382/202, 208, 382/135, 137, 138, 194, 316, 199, 275, 254, 205, 180; 358/447, 448, 453

[56] References Cited

U.S. PATENT DOCUMENTS

| | | | |
|---|---|---|---|
| 4,292,622 | 9/1981 | Henrichon, Jr. | 382/177 |
| 4,298,895 | 11/1981 | Arai et al. | 382/275 |
| 4,747,156 | 5/1988 | Wahl | 382/275 |
| 4,996,603 | 2/1991 | Kanemitsu et al. | 358/462 |
| 5,054,099 | 10/1991 | Wakabayashi et al. | 382/298 |
| 5,121,222 | 6/1992 | Endoh et al. | 358/451 |
| 5,371,606 | 12/1994 | Katayama et al. | 358/400 |
| 5,408,338 | 4/1995 | Koike | 358/448 |
| 5,467,410 | 11/1995 | Bloomberg | 382/180 |
| 5,485,288 | 1/1996 | Kamei et al. | 358/530 |
| 5,548,415 | 8/1996 | Tanaka et al. | 358/462 |
| 5,604,596 | 2/1997 | Ukai et al. | 358/296 |
| 5,680,529 | 10/1997 | Matsumoto | 395/139 |
| 5,751,854 | 5/1998 | Saitoh et al. | 382/218 |

*Primary Examiner*—Jon Chang
*Attorney, Agent, or Firm*—Dickstein Shapiro Morin & Oshinsky LLP

[57] ABSTRACT

It is an object of this invention to provide an image processing device which would be able to extract a specified pattern accurately even if there are fine lines in its periphery. The invention is configured as follows in order to achieve this object. The density data for R, G and B are transmitted to fine line processor. There a count is made of the number of pixels among the eight surrounding a center object pixel, which have density values within a fixed margin of the center object pixel. If there are three or fewer, the center object pixel is judged to be part of a line segment, and the determination flag 0 is output. If there are four or more, the center pixel is judged to be not part of a line segment, but a part of pattern. Once the object pixel is judged to be a part of a line segment, then a line removal device remove the object pixel from the image data in order to extract a specified pattern.

13 Claims, 19 Drawing Sheets

NUMBERS IN PARENTHESES REFER TO LINES

FIG. 6

| Label | Values |
|---|---|
| DENSITY DATA FOR PROCESSING SECOND LINE | $0_2$ \| $1_2$ \| $2_2$ \| $3_2$ \| $4_2$ |
| ADDRESSES IN LINE MEMORY | 00H \| 01H \| 02H \| 03H \| 04H |
| READ SIGNAL (1) | (pulse train) |
| WRITE SIGNAL (1) | (flat) |
| READ SIGNAL (2) | (pulse train) |
| WRITE SIGNAL (2) | (pulse train) |
| OUTPUT OF F/F 1 | (transitions) |
| OUTPUT OF F/F 2 | $0_1$ \| $1_1$ \| $2_1$ \| $3_1$ |
| OUTPUT OF F/F 3 | $0_2$ \| $1_2$ \| $2_2$ \| $3_2$ |

IMAGE OUTSIDE THIS RANGE IS ALL INPUT AS WHITE

FIG. 10

| 1 | 2 | 3 | 4 | 5 | 6 | 7 | 8 |
|---|---|---|---|---|---|---|---|
| 9 | 10 | 11 | 12 | 13 | 14 | 15 | 16 |
| 17 | 18 | 19 | 20 | 21 | 22 | 23 | 24 |
| 25 | 26 | 27 | 28 | 29 | 30 | 31 | 32 |
| 33 | 34 | 35 | 36 | 37 | 38 | 39 | 40 |
| 41 | 42 | 43 | 44 | 45 | 46 | 47 | 48 |
| 49 | 50 | 51 | 52 | 53 | 54 | 55 | 56 |
| 57 | 58 | 59 | 60 | 61 | 62 | 63 | 64 |
| 65 | 66 | 67 | 68 | 69 | 70 | 71 | 72 |
| 73 | 74 | 75 | 76 | 77 | 78 | 79 | 80 |

IMAGE

FIG. 12

256 STEP VALUE (HEX) DATA (R, G, B)

| | | | | | | | |
|---|---|---|---|---|---|---|---|
| 10.10.10 | 2F.31.32 | 10.11.10 | 2F.31.33 | 10.10.10 | 31.30.30 | 11.10.10 | 30.2F.30 |
| 11.10.12 | 30.30.33 | 11.10.10 | 30.33.33 | 11.0F.11 | 32.30.31 | 10.11.11 | 31.30.2D |
| 13.11.13 | 30.30.33 | 0E.0F.11 | A0.F0.F0 | 9E.ED.EE | A1.F0.EF | 9E.EF.ED | A2.F0.F1 |
| 0E.12.10 | 33.30.32 | 11.0F.12 | A1.EF.F2 | 9F.EC.F0 | A0.EF.F0 | 9F.ED.EE | A1.F1.F0 |
| 12.10.10 | 32.2E.31 | 12.10.12 | 30.30.32 | 12.11.13 | 32.31.30 | 9E.ED.EE | A1.F1.F1 |
| 10.10.10 | 32.2D.31 | 11.11.10 | 31.30.31 | 10.10.13 | 31.31.2F | 9E.EC.ED | A1.F2.F2 |
| 10.13.12 | 30.2F.31 | 10.10.10 | 31.32.30 | 11.10.13 | 31.30.2F | 9E.ED.EC | A3.F3.F1 |
| 11.0D.12 | 11.0D.11 | 10.13.10 | 31.33.2F | 10.0F.12 | 32.31.2E | 9D.EC.ED | A2.F3.F0 |
| 11.10.10 | 11.10.11 | 13.10.13 | 30.33.2F | 10.0F.11 | 33.31.30 | 9D.ED.EE | A3.F3.F0 |
| 0F.10.11 | 0F.10.11 | 14.10.12 | 30.33.2F | 11.10.11 | 33.30.30 | 9E.EC.EE | A2.F2.F1 |

FIG. 13

| 1 | 2 | 3 |
|---|---|---|
| 9 | 10 | 11 |
| 17 | 18 | 19 |

FIG. 14

| 14 | 15 | 16 |
|---|---|---|
| 22 | 23 | 24 |
| 30 | 31 | 32 |

‥REGION WHERE THERE IS A BLACK PIXEL

‥DON'T CARE

IMAGE PROCESSING DEVICE AND METHOD FOR DETECTING AND REMOVING FINE LINES IN AN IMAGE PATTERN

FIELD OF THE INVENTION

This invention concerns an image processing device and method for detecting and removing fine lines in an image pattern. More specifically, it concerns an image processing device and method ideally suited for detecting line segments of less than a given thickness (fine lines) which are not germane to the detection of a specified pattern and removing the fine lines which it detects.

BACKGROUND OF THE INVENTION

Image processing devices such as copiers and printers are a convenient and simple means of producing multiple copies of documents which have the same content as the original. However, if an original which must not be made public, such as a top-secret document, is copied, it is conceivable that copies of it will find their way out into the world. As long as an original exists, it is very difficult to monitor or detect the fact that a copy of it exists or that the copy has been removed from the premises. This has prompted a demand for some way to make it impossible to copy critical papers such as top-secret documents. This has become increasingly true as trade secrets have become the focus of greater attention.

To meet this demand, devices have been developed to prevent the copying of proscribed documents. Such devices store an image associated with a specified pattern. They render a judgment as to whether an input image, which is the image meant to be copied, contains the specified pattern. If it does, they make the entire screen go black or prevent the copy operation from proceeding. If the paper used for confidential documents is imprinted with this specified pattern, then, they will, in theory at least, be impossible to copy.

Recent improvements in the quality of full-color copiers have made it nearly impossible to distinguish a copy from an original with the naked eye. In this case there are devices which allow the document to be copied but indicate on the copy that it is not an original. If the specified pattern is found in the input image, the copy will be output with a logo such as the word "copy" imprinted faintly on it.

In either case, it is necessary to detect whether the input image contains the specified pattern. To extract the features needed to detect the pattern, the image is binarized using peripheral contrast and the portion of the image containing the features is extracted.

PROBLEMS THAT THIS INVENTION SOLVES

With the prior art method described above, one must extract features from an image containing a number of colors of varying contrast. One must thus provide a number of processing systems with threshold values and judgment standards to accommodate each level of contrast. This results in the system being configured on an extremely large scale.

It is desirable that the specified pattern not be easily discernible to someone who wishes to copy the document. It might, for example, be something which readily blends in with the background pattern. Choosing such a pattern, however, results in only a slight contrast between the pattern and the surround, which makes it difficult to extract the pattern.

Another problem with the prior art method is that without the aforesaid processing or course of actions which prohibit copying, an original will in principle be copied exactly. This makes it critical that the goodness of fit (the threshold value used as a judgment standard) employed to extract and recognize the specified pattern be kept high. This being the case, it is conceivable that someone could cause the program to fail to recognize the specified pattern simply by adding some lines along its periphery

SUMMARY OF THE INVENTION

The object of this invention is to provide an image processing device and method which would address these difficulties as follows. Such a device and method would not fail to extract the characteristic image (i.e., the pattern). The processor would be realized as a single system which could process a number of images with different levels of contrast, and it would not fail to extract the specified pattern even when its contrast with the surround is slight. The pattern would not be obvious to the eye, so it would be tamper-resistant.

In order to achieve the objectives outlined above, the image processing device of this invention is designed to detect a line segment of less than a given thickness in a set of image data. This image processor comprises a fine line processor. This fine line processor comprises: a pixel processing device for extracting the density value A of the object pixel in the image data which is to be processed and the density value B of the surrounding pixels, and which, using density value A as a reference, detects the pixels of a density value B which is within a fixed range of value A; and a judging device which counts the number of pixels detected by the pixel processor device and, if that number is within a given value, determines that the object pixel which is being processed is a constituent of a line segment of less than a given thickness.

It is desirable that the pixel processing device and judging device have a number of discrete systems corresponding to a number of different colors, for each of which the processing and judging are executed independently. There should also be a final determination unit which receives the output of each of the determination systems for each color and, based on the result of each determination, makes a final determination as to whether the pixel which is being processed is a constituent of a line segment of less than a given thickness. There should also be a line removal unit which receives the output of either of the preliminary or final determination unit and removes the object pixels which have been determined to constitute a line segment of less than a given thickness. There should be a pattern extraction unit connected to the end stage of the line removal unit to execute threshold processing on the density data for each pixel in order to extract the specified pattern from the image data remaining when the fine lines have been removed by the said line removal unit.

The final determination unit used here should be able to determine, when the pixels in question are manifest as multiple color data, whether the pixels in the final stage of processing constitute a fine line (i.e., a line segment of less than a given thickness). The actual device suggested in the ideal embodiment recognizes a fine line when color data of any color are determined to be a line. However, the invention is not limited to this case only. It would also be possible to use majority logic and go with the majority when the data for each color have been judged as constituting or not constituting a fine line. Various other determination methods could also be used.

The image processing method devised by this invention is as follows. A density value A is obtained for the specific object pixel in question in a set of image data. Using the density value A as a reference, a count is made of the surrounding pixels which have a density value B which is within a given range of value A. If the number of surrounding pixels counted is within a given value, it is determined that the object pixel in question is a constituent of a line segment of less than a given thickness. If the object pixel in question is manifested as multiple color data, the determination processing described above is executed on the data for each color. A determination is made based on the result obtained for each color as to whether this pixel is a constituent of a line segment of less than a given thickness.

If in each of the aforesaid determination processes it is determined that the object pixel is a constituent of such a line, the density data associated with this pixel are converted to a specified value such as 00 (white).

An alternative image processing device could comprise a binarizing device which binarizes the image data it receives and generates binary image data; and a binary judging device which performs pattern matching on a region of n×m pixels in the binary image data generated by the binarizing device. By determining whether this region matches any of a set of previously established reference patterns, it would determine whether these pixels constituted a line segment of less than a given thickness. Such a device would receive the output of either of the aforesaid preliminary or final determination devices and remove the pixels which have been determined to constitute a line segment of less than a given thickness. The reference pattern could be composed entirely of fine lines or it could contain no fine lines.

The processing method of this invention is as follows. The image data which are received are binarized. Pattern matching is performed on every region of n×m pixels in the binary image data so obtained. By determining whether this region matches any of a set of previously established reference patterns, it is determined whether these pixels constitute a line segment of less than a given thickness. The pixels constituting this line segment can then be removed.

FIRST EMBODIMENT

Let us assume that there are fine lines along the periphery of the specified pattern which we wish to detect and remove. Because of color continuity and other factors, pixels constituting a single pattern will differ only slightly in density from one pixel to the next. If there are fine lines, the density values of the pixels constituting those lines will be close to each other, and there will be a significant difference between the density of the lines and that of the pixels in the surround. If we look at a given pixel and compare its density value A with the density value B of the pixels surrounding it, the values of A and B will be similar for pixels constituting a line but will differ significantly if one pixel is in a line and the other is in the surround. Similarly, the densities A and B of neighboring pixels in a specified pattern will be similar. We can thus search the surrounding pixels, and if density value B is within a fixed range of density value A, we can conclude that it is part of the same pattern (i.e., that they are both part of the same specified pattern or line). If the pixel is part of a line, the number of pixels within a fixed range of it will be small (since the line itself is thin, the number of pixels in the surround will be high). If the number of pixels is below a given value, then, we can determine that we have found a thin line.

Once we determine that a pixel is a constituent of a line, we can remove it, and the fine lines around the pattern will disappear, causing it to stand out from the background. The pattern can easily be extracted in this way by binarizing the data. However, the threshold value for binarization must be chosen so as to provide a sufficient margin with respect to the density value of the pattern. Let us, for example, consider a case in which the untreated image has thin lines which contrast only slightly with the pattern. To binarize the image as it is and extract the specified pattern, the threshold value must be set at a level between that of the pattern and that of the lines. This leads to a high incidence of detection errors (i.e., because the margin of the threshold value is so small, the pattern is difficult to separate from the surround). With this embodiment, the fine lines have already been removed from the image, resulting in a large contrast difference between the pattern and the surround, and a large margin can be established for the threshold value.

Once the pattern has been extracted in this way, pattern recognition would normally be executed to determine whether this pattern is, in fact, the specified pattern (the relevant processing is not essential to this invention—It can be executed by various commonly available programs). With this embodiment of the invention, the specified pattern in the untreated image blends in with the fine lines which surround it so that it is not conspicuous. Before it is determined whether this is the right pattern, the fine lines are removed so that the pattern stands out from its surround. This allows an accurate determination to be made. This method also makes it ineffective to tamper with the document by adding lines around the pattern. Since the lines are removed, the pattern will be extracted reliably even though lines have been added.

SECOND EMBODIMENT

With the second embodiment, pattern matching is executed after the image data which are received have been binarized. A determination is made as to whether these image data match any of a set of previously established reference patterns. If it is determined that there are fine lines in the image, the relevant data are removed. This method lacks the advantage of the first embodiment in that a rough threshold value cannot be used for binarization. Nevertheless, it does remove the fine lines, so the pattern can blend in with the fine lines around it in the untreated image and be inconspicuous. The fine lines are removed before attempting to determine whether this is the right pattern. The pattern is made to stand out from the background to insure that it can be recognized accurately. This method also makes it more difficult to tamper with a document by adding lines.

The above and other objects, advantages and features of the various embodiments of the invention will be more readily understood from the following detailed description of the invention which is provided in connection with the accompanying drawings.

BRIEF DESCRIPTION OF THE DRAWINGS

FIG. 6 is a timing chart which illustrates the operational state of the fine line determination unit.

FIG. 10 illustrates the operation of the image processing device in the first embodiment of this invention.

FIG. 12 illustrates the operation of the image processing device in the first embodiment of this invention.

FIG. 13 illustrates the operation of the image processing device in the first embodiment of this invention.

FIG. 14 illustrates the operation of the image processing device in the first embodiment of this invention.

DETAILED DESCRIPTION OF THE INVENTION

Figure 1:
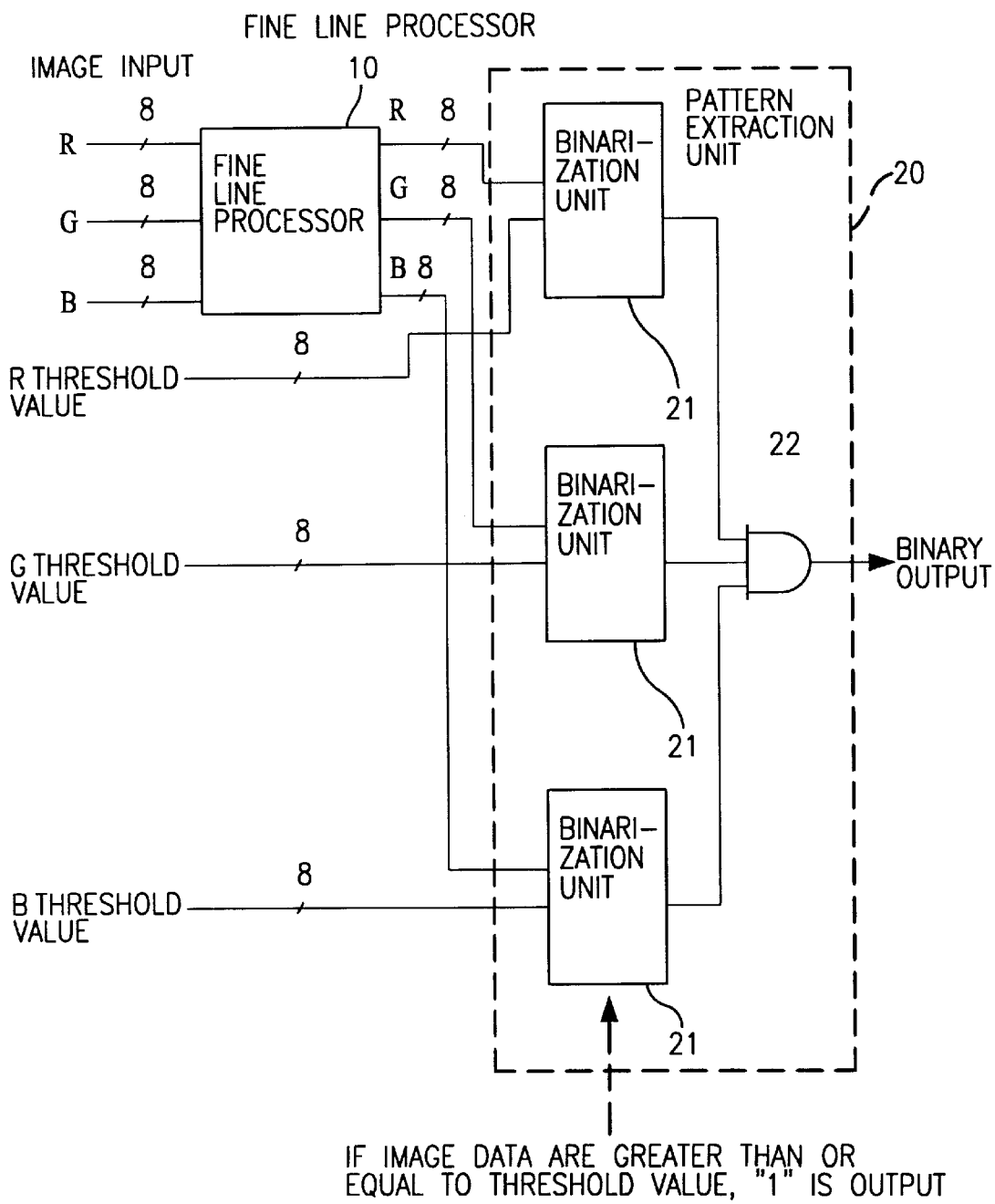
FIG. 1 shows the overall configuration of an image processing device in a first embodiment of this invention.

We shall now discuss a preferred embodiment of the image processing device and method of this invention with reference to the appended drawings. FIG. 1 is a first embodiment of this invention. As can be seen in the drawing, the RGB image data (256 colors) which constitute the color data for each pixel obtained by an imaging device such as a CCD are transmitted to fine line processor 10. There a determination is made for each pixel as to whether it is a constituent of a line. If it is, processing is executed to remove it.

Once the appropriate line processing to remove a fine line has been performed, the image data are transmitted to pattern extraction unit 20. There they are binarized so that the specified pattern will stand out from its background. If the pattern is surrounded by fine lines in the untreated document, it will not be discernible. When the image passes through fine line processor 10, the lines will be removed, and the pattern will stand out. It will, accordingly, become easier to detect. By the same token, if someone has tampered with the document by adding extra lines to it, those lines will be removed in the line processing. This makes the pattern more tamper-resistant.

Figure 2:
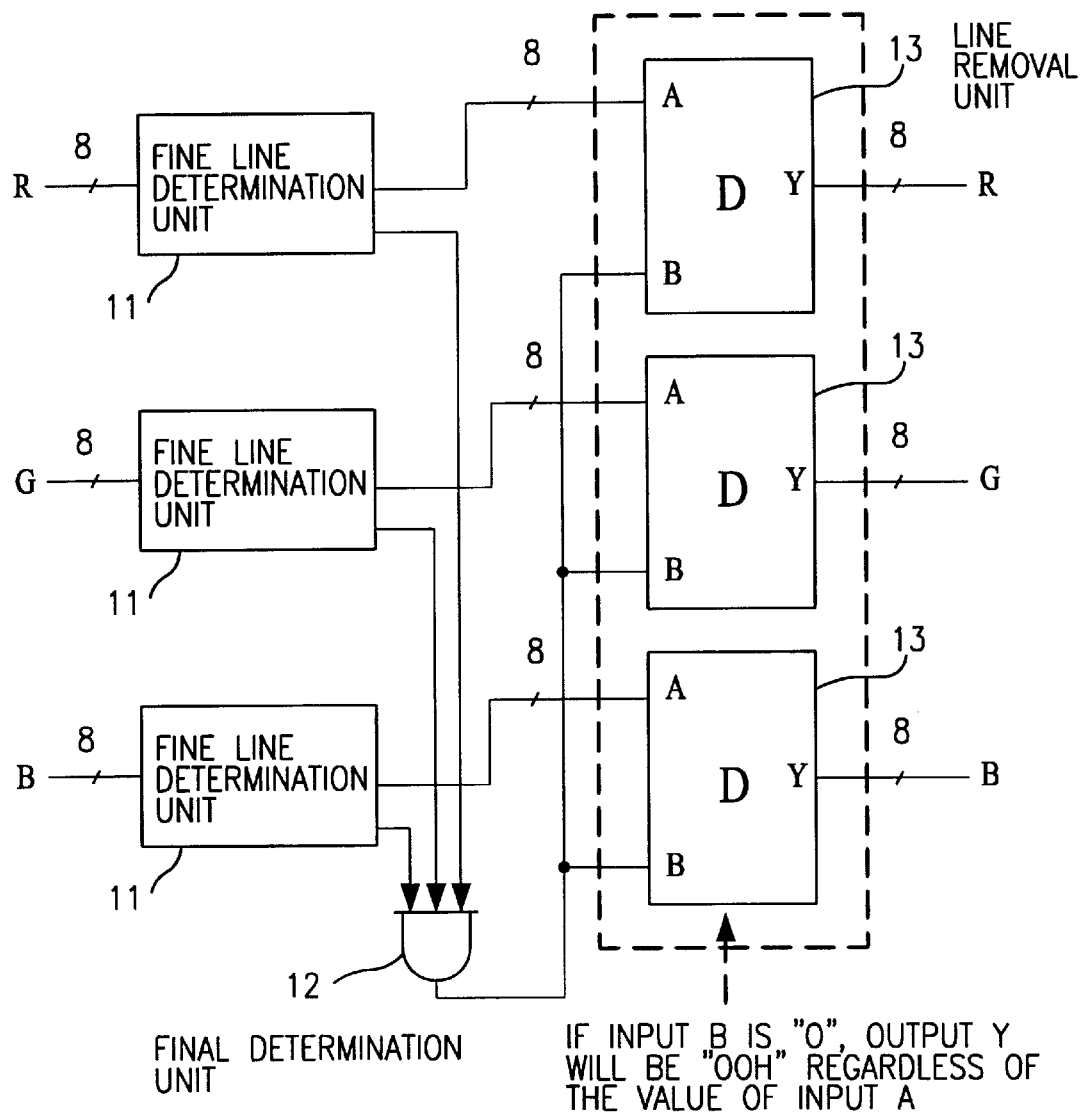
FIG. 2 shows the internal configuration of the fine line processor.

The actual configuration of the device which performs the processing discussed above is as follows. Fine line processor 10, which is pictured in FIG. 2, consists of three line determination units 11, one for each of the three colors (R, G and B); final determination unit 12, which receives the output of each unit 11 and makes a final determination for each pixel in question as to whether it is part of a line; and line removal unit 13, which, based on the result of determination unit 12 and the image data output by line determination units 11, removes the fine lines.

Figure 3:
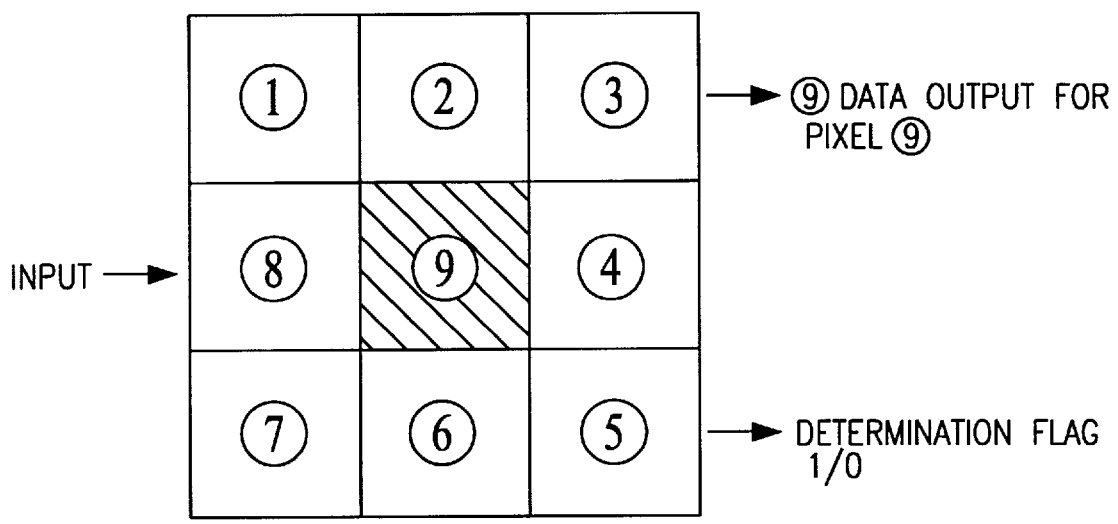
FIG. 3 illustrates the principle underlying the fine line determination unit.

Each determination unit 11 receives, from the image data which are read in the direction of the raster, one color of the R, G and B data, a pixel at a time. Let us consider the data representing a single color. As is shown in FIG. 3, the density data for the pixel being considered, object pixel (9), is compared with those of the eight surrounding pixels (pixels (1) through (8)). Using these eight pixels, a count is made of the number of pixels for which the multivalued data representing the density fall in the range of ±x ("x" is an inputted variable) of the value for pixel (9). If the number of pixels in this range is equal to or less than a given value (in this example, 3), it is determined that pixel (9) is part of a line segment. If it is judged to be part of a line, the "0" flag is outputted. If four or more pixels are within the margin which has been set (±x), it is determined that pixel (9) is not part of a line segment, and the "1" flag is outputted. The density data for pixel (9) are outputted along with the appropriate flag.

Figure 4:
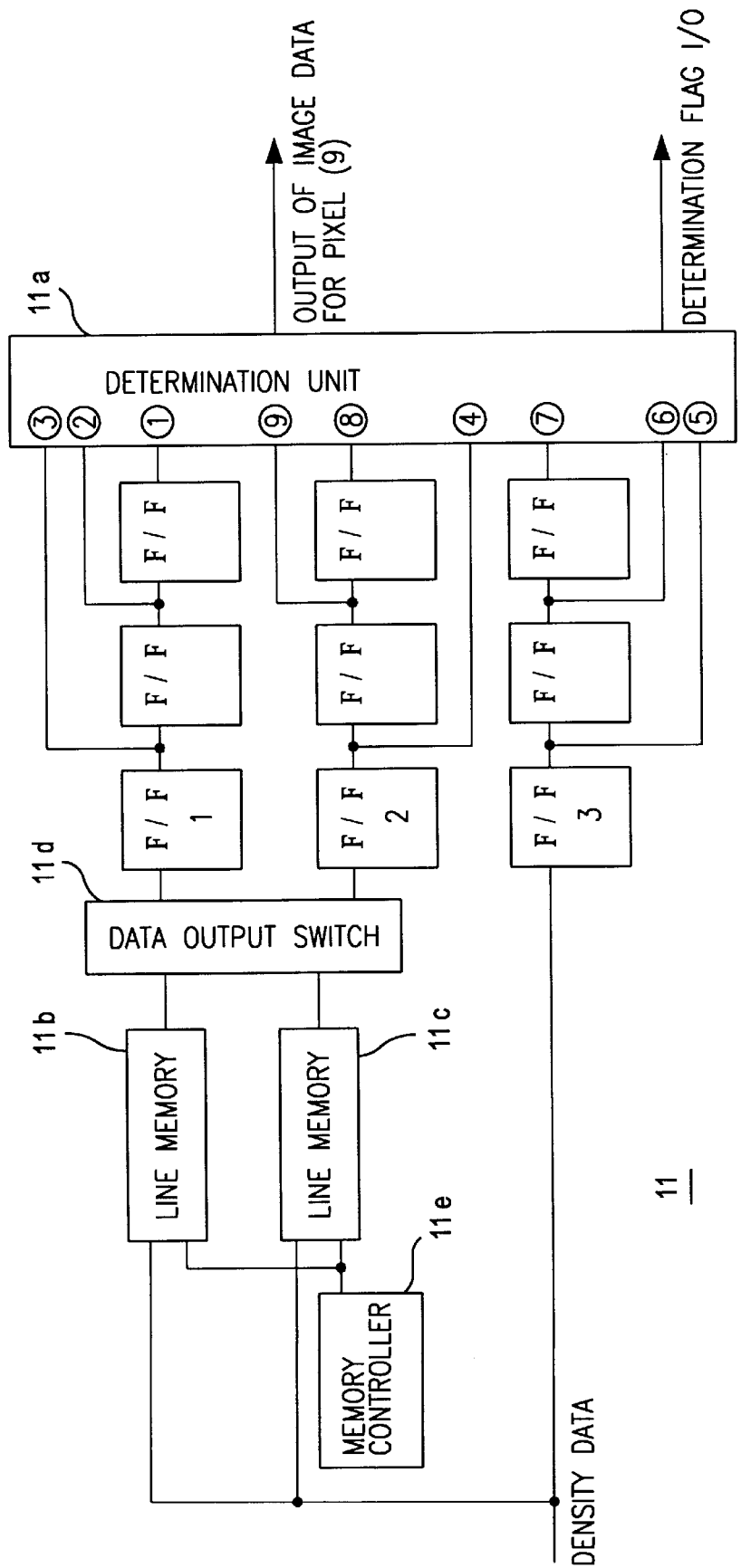
FIG. 4 shows the internal configuration of the fine line determination unit.

The actual configuration of the circuit which executes the determination processing is shown in FIG. 4. To store the density data for the aforesaid nine pixels (the pixel in question and the eight that surround it), nine flip-flops (F/Fs) are arranged in a 3×3 matrix. The output of each flip-flop is transmitted to determination unit 11a. The imaging device reads the original document line by line and outputs R, G and B data in order from the head pixel in each line. In this example, two line memories are provided to furnish the data for the eight surrounding pixels. These memories, 11b and 11c store the data for the two most recent lines. The output of line memory 11b or 11c is selected by a data output switch 11d (which might, for example, be a multiplexer). Switch 11d allows the user to select the output (i.e., the data transmission) of either the head flip-flop F/F 1 in the first row or the head flip-flop F/F 2 in the second row. Line memories 11b and 11c read the data transmitted from the input side or transmit to a specified flip-flop the density data stored at a given address. They act in accordance with a control signal (a read/write signal) from memory controller 11e.

Figure 5:
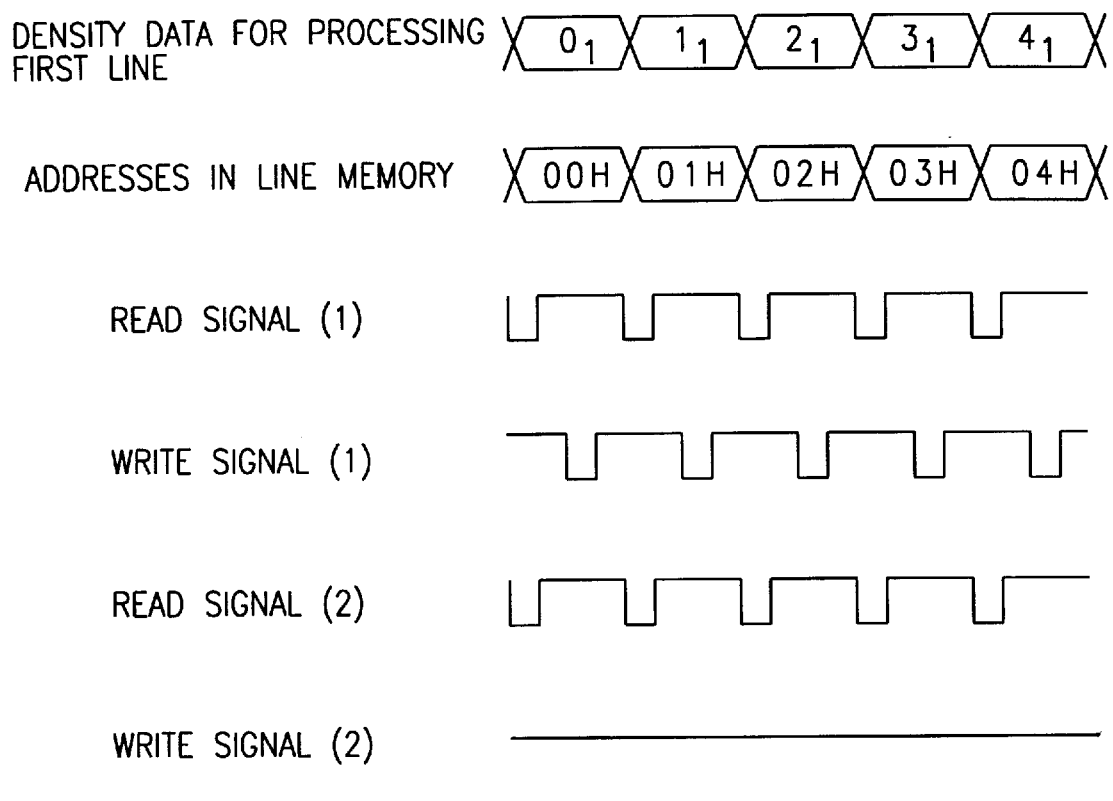
FIG. 5 is a timing chart which illustrates the operational state of the fine line determination unit.
Figure 7:
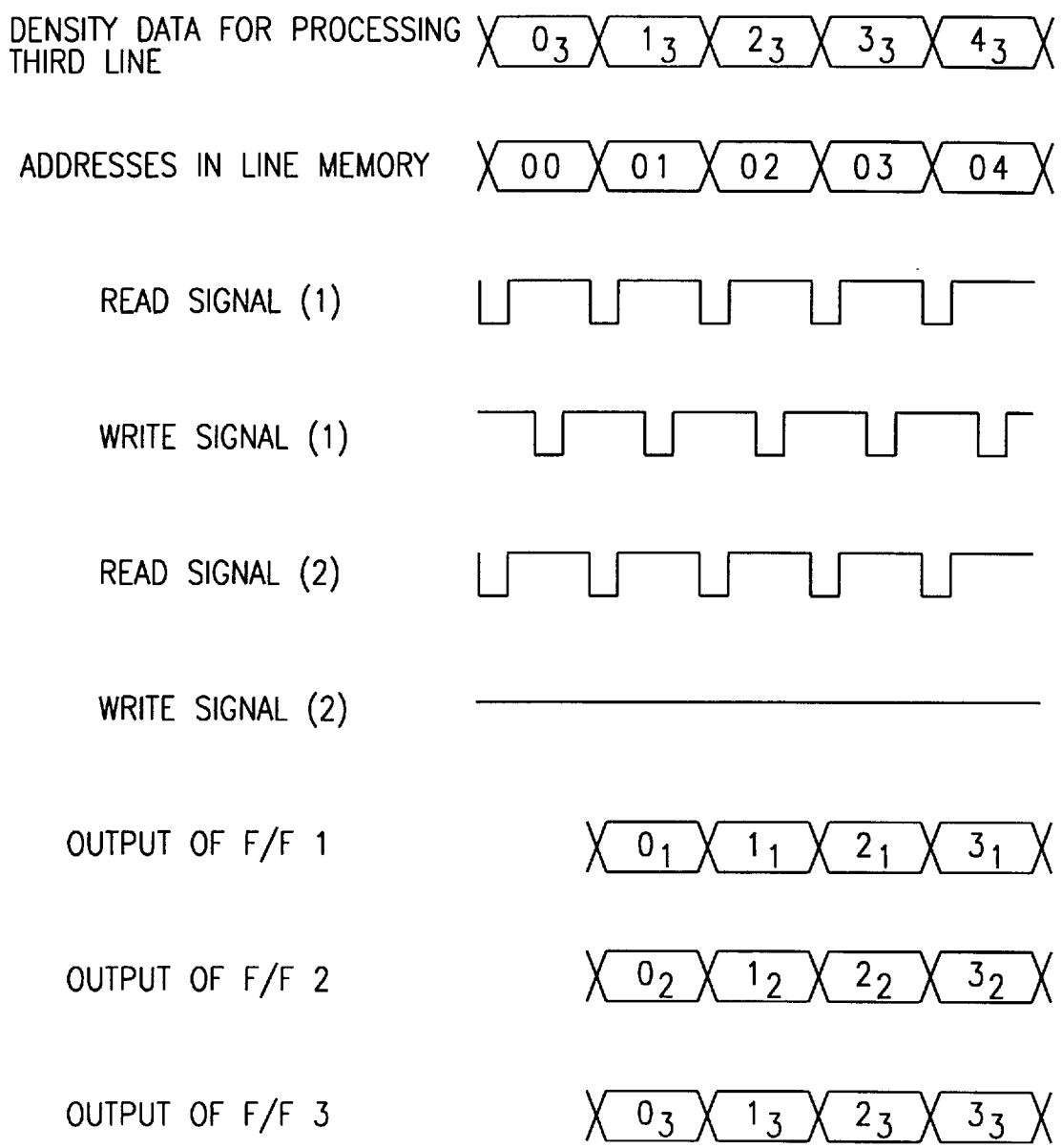
FIG. 7 is a timing chart which illustrates the operational state of the fine line determination unit.

More specifically, the density data for the first line in the untreated image are stored in line memory 11b according to the timing chart shown in FIG. 5. The density data for the second line in the image are stored in line memory 11c according to the timing chart shown in FIG. 6. The data for the third line in the image are stored as they are in the head flip-flop of the third line, F/F 3. The density data for each pixel which are stored in line memories 11b and 11c are transmitted to the corresponding flip-flop in order, starting from the head pixel in each line (11b to F/F 1, 11c to F/F 2). In this way the transmission of the density data from each line memory to the flip/flops is synchronized with the timing of the transmission of the density data for each pixel in the third line. Thus the density data for each of the 3×3 pixels in lines 1 through 3 of the original document are stored in these nine flip-flops (see FIG. 7). As a result, the data for the pixel being processed are found in line 2 of the original image.

In order to execute the data processing of the pixels in lines 2 through 4 of the document (for which the pixels in question are all of those in line 3) which accompanies the reading of the data for line 4, the data stored in line memory 11b which are not needed for this processing are written over with the data for line 3 which are currently being read. In other words, while the density data for the necessary pixels in line 1 are being read out, the density data for the pixels in line 3 are being stored in their place. With this method, when all the data for line 3 have been read, they are stored in line memory 11b, while the data for line 2 which are stored during the previous processing are still maintained.

Figure 8:
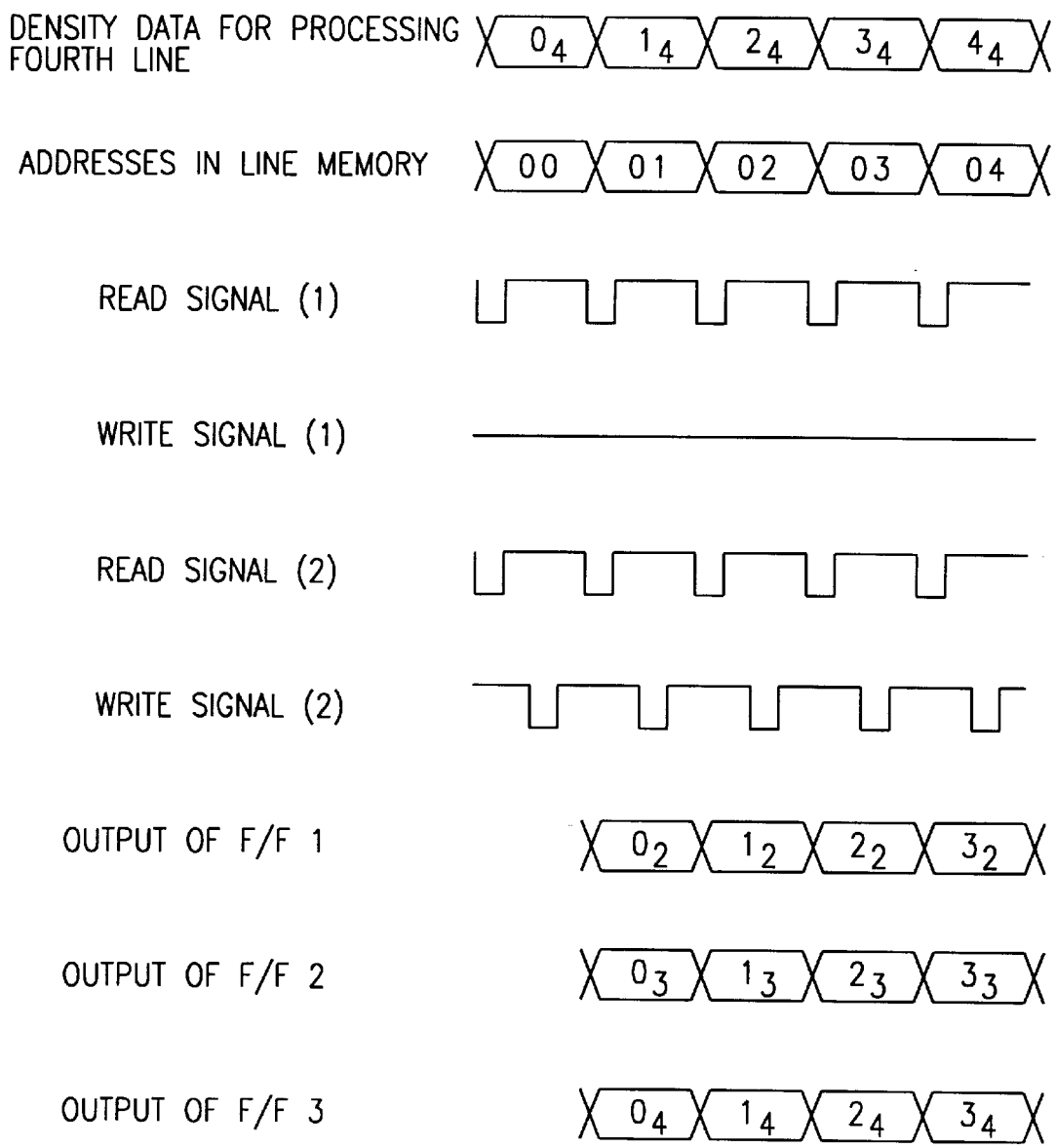
FIG. 8 is a timing chart which illustrates the operational state of the fine line determination unit.

When the data for line 4 are read, data output switch 11d is actuated to switch the output path. The output of line memory 11b is sent to the head flip-flop F/F 2 of line 2, and the output of line memory 11c is sent to the head flip-flop F/F 1 of line 1. Thus the density data which are read are stored in F/F 3, the head flip-flop of line 3, and the data stored in memories 11b and 11c are sent to the appropriate flip-flops, all in real time. In this way the density data for each pixel in the 3×3 grid formed by lines 2 through 4 in the untreated document are stored (see FIG. 8). The density data for line 4 which are read at this time are stored in line memory 11c.

When this processing is repeated, the image data read in real time are temporarily stored in the line memories, while the density data for the object pixel and the eight pixels that surround it are stored in the nine flip-flops. The data stored in the flip-flops when they are sent are read out by determination unit 11a, and the relevant determination processing is executed.

Using the density data for object pixel (9) (see FIG. 3), which are output by the central flip-flop, as a reference value, a determination is made for each of the other eight flip-flops as to whether the density data for that pixel is within a given margin of the reference value. The pixels whose values are within the margin are counted. If this value is less than or equal to 3, the 0 flag is output; if it is 4 or greater, the 1 flag is output. Determination unit 11a outputs the appropriate flag and the density data for the object pixel.

Figure 9:
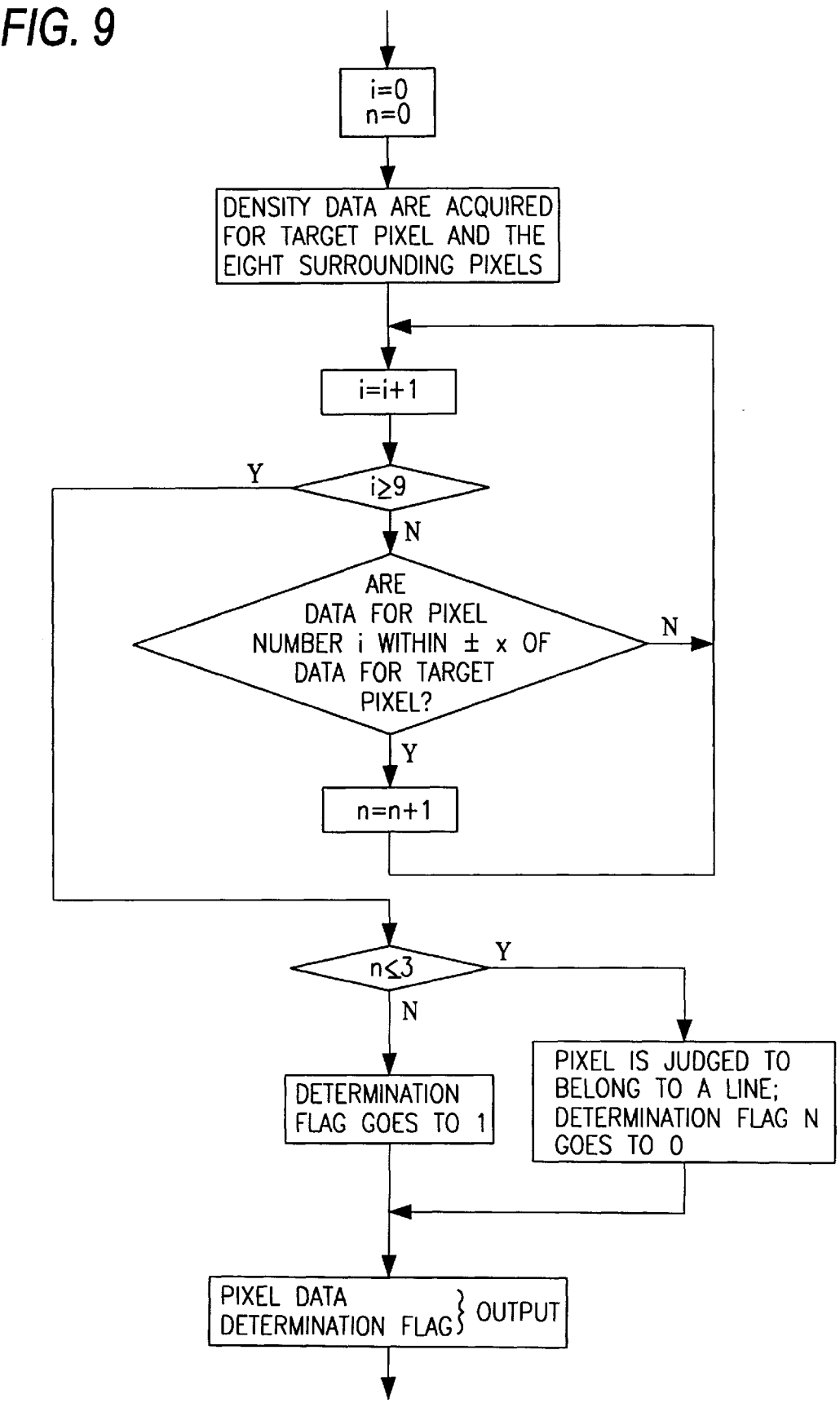
FIG. 9 is a flowchart of the functions performed by the fine determination unit.

The processing here is a comparison of the size of numerical values. This processing could be executed by hardware, or by software with the processing function shown in FIG. 9. In this figure, i is the number of the pixel (the number shown in a circle in FIG. 3) and n is the number of pixels with a density value close to (i.e., within a fixed margin of) that of the object pixel.

Final determination unit 12 makes a cumulative decision based on the results of determination unit 11 for each of the three colors, determining whether the object pixel is part of a line. In this example, if the pixel is judged to be part of a line in even one of the R, G or B results, that pixel will be judged to belong to a line. This determination unit actually consists of 3-input AND circuit 12 shown in FIG. 2. The output of each flag in determination unit 11 is connected to one of its input circuits. If the pixel is found to belong to a line, the output will be 0; if it is not, the output will be 1.

When the result of final determination unit 12 is that the pixel is in a line (0), line removal unit 13 executes the processing which removes the line and outputs the multi-value data "00" (white) regardless of the density data of the original image. To be more specific, line removal unit 13 consists of a gate circuit 13, a logic circuit such that when input B is 0 (see FIG. 2) the output will be "00" regardless of the value of input A; when input B is 1, the value of input A will be output as is. The output data from each line determination unit 11, i.e., the R, G and B density data for a given pixel, are sent to input terminals A on gate circuit 13. The outputs of the aforesaid AND circuit 12 are connected to input terminals B. If line processor 10 determines that the pixel is part of a line, the R, G and B data all go to "00". If it determines that the pixel is not part of a line, the R, G and B density data are output without change.

Pattern extraction unit 20, which extracts the specified pattern, is pictured in FIG. 1. It consists of binary units 21, which binarize the R, G and B data from the line processor 10, and AND circuit 22, which receives the output of binary units 21. A threshold value is established in each binary unit 21 for the specified pattern which is to be extracted. If after the lines have been removed all of the R, G and B data are over the threshold value, the pattern extraction unit causes the binary output to be "1". If one of the three colors does not exceed the threshold value, the binary output will be "0".

Figure 11:
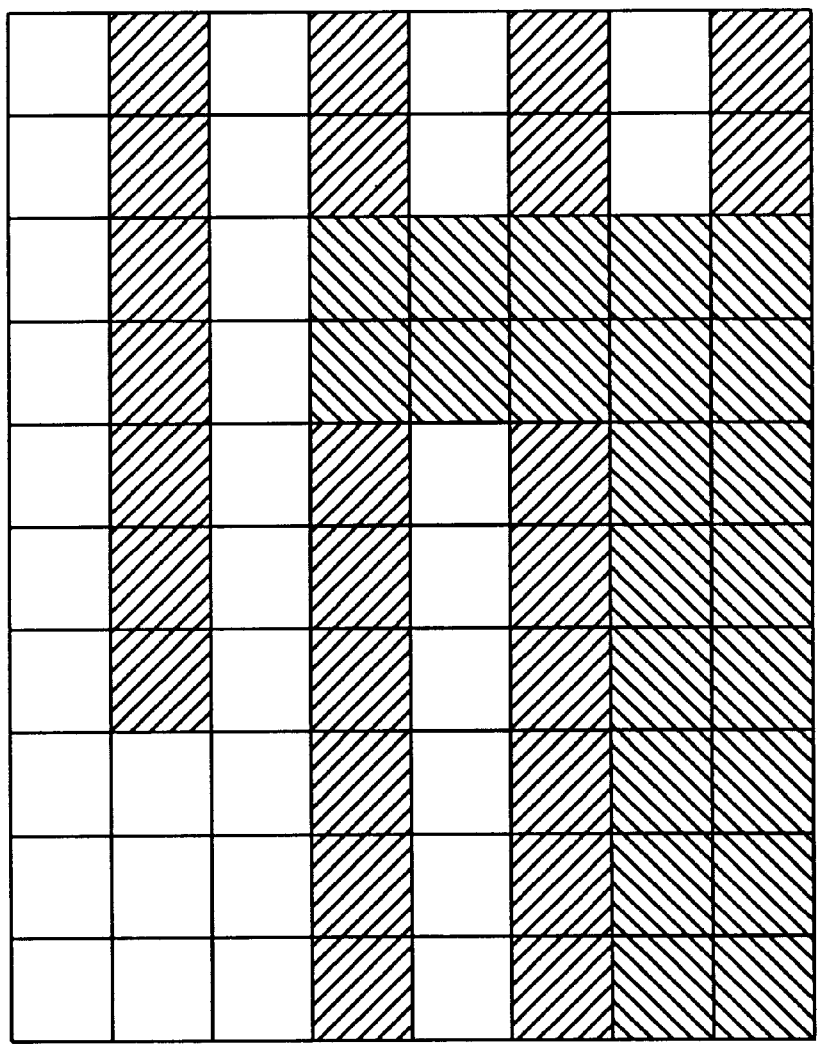
FIG. 11 illustrates the operation of the image processing device in the first embodiment of this invention.

We shall now discuss the operation of the first embodiment. We shall explain the order of processing executed to remove a line from an image 8 pixels wide by 10 pixels high. As shown in FIG. 10, each pixel in the said processing region is given a pixel number. The line processing is executed in the order of these numbers. In this region, as is shown in FIG. 11, there are several vertical lines one pixel wide and one pixel apart on the even-numbered pixels. There is also an L-shaped target pattern which is two pixels wide. The density data for each pixel read (256 steps) are as shown in FIG. 12. The three numbers shown for each pixel in FIG. 12 are the density data for R, G and B, beginning on the left, given in HEX notation.

When the image data are captured, the density data for R, G and B shown in FIG. 12 are sent to line processor 10 shown in FIG. 1 in order starting from pixel number 1. Line processor 10 temporarily stores the appropriate data in line memories 11b and 11c in determination unit 11 shown in FIG. 4. At the same time, unit 11 receives the density data for each pixel and the eight pixels which surround it and decides, in the numerical order of the pixels, whether each pixel is part of a line.

For example, let us consider what happens when pixel number 1 is processed. Since this is a corner, there are actually only three surrounding pixels rather than eight, pixels number 2, 9 and 10. Only one, pixel number 9, has a density value close to that of pixel number 1, so it is determined that pixel number 1 is part of a line. The flag for pixel number 1 goes to 0, and the R, G and B data output by line processor 10 go to (00, 00, 00). Because all the data are below the threshold value, pattern extraction unit 20 causes the binary data which are to be output to go to 0.

When pixel number 10, which has just been processed, itself becomes the object pixel, the eight surrounding pixels with which it is to be compared will be those shown in FIG. 13. Let us consider only the R density data, which are given in Table 1 below.

TABLE 1

| PIXEL NUMBER | R (256 COLOR VALUES) |
| --- | --- |
| 1 | $10_H$ |
| 2 | $2F_H$ |
| 3 | $10_H$ |
| 9 | $11_H$ |
| 10 | $30_H$ |
| 11 | $11_H$ |
| 17 | $13_H$ |
| 18 | $30_H$ |
| 10 | $0E_H$ |

Only pixels 2 and 18 have a density within the fixed margin from that of the object pixel (30); therefore pixel 10 will be judged to be part of a line. Through the same processing as described above, the final binary data will also go to 0.

When pixel 23 is the object pixel, the eight surrounding pixels will be those pictured in FIG. 14. If we again consider only the R density data, which are given in Table 2 below,

TABLE 2

| PIXEL NUMBER | R (256 COLOR VALUES) |
| --- | --- |
| 14 | $32_H$ |
| 15 | $10_H$ |
| 16 | $31_H$ |
| 22 | $A1_H$ |
| 23 | $9E_H$ |
| 24 | $A2_H$ |
| 30 | $A0_H$ |
| 31 | $9F_H$ |
| 32 | $A1_H$ | we find that five pixels are within the fixed margin of the density value (9E) of the object pixel: pixels 22, 24, 30, 31 and 32. With respect to the R data, pixel 23 will be determined not to be part of a line, and its flag will go to 1. The determination unit 11 for R will output the density data (9E) for this pixel. The G and B data will be evaluated in the same way. In this case, all the data will be judged not to belong to a line, so line processor 10 will output without modification the R, G and B density data which are captured (9E, EF, ED).

All the data are sent to pattern extraction unit 20, where they are compared with their threshold values. Since all the data are above the threshold values (each threshold may be set at a value midway between the density of the pattern and that of the surround, for example somewhere between 60 and 80), the final binary data will go to 1.

When pixel 24 is the object pixel, three of the surrounding pixels are within the fixed margin of its density: pixels 23, 31 and 32. Pixel 24 will thus be judged to be part of a line.

When pixel 66 is the object, all eight of its surrounding pixels are within the margin for density, so it will be judged not to be part of a line. Line processor 10 will output the density data just as they are captured (11, 10, 11). However, all data are sent to pattern extraction unit 20, where they are compared with their threshold values. Since all the data are below their thresholds, the final binary data will be 0.

Figure 15:
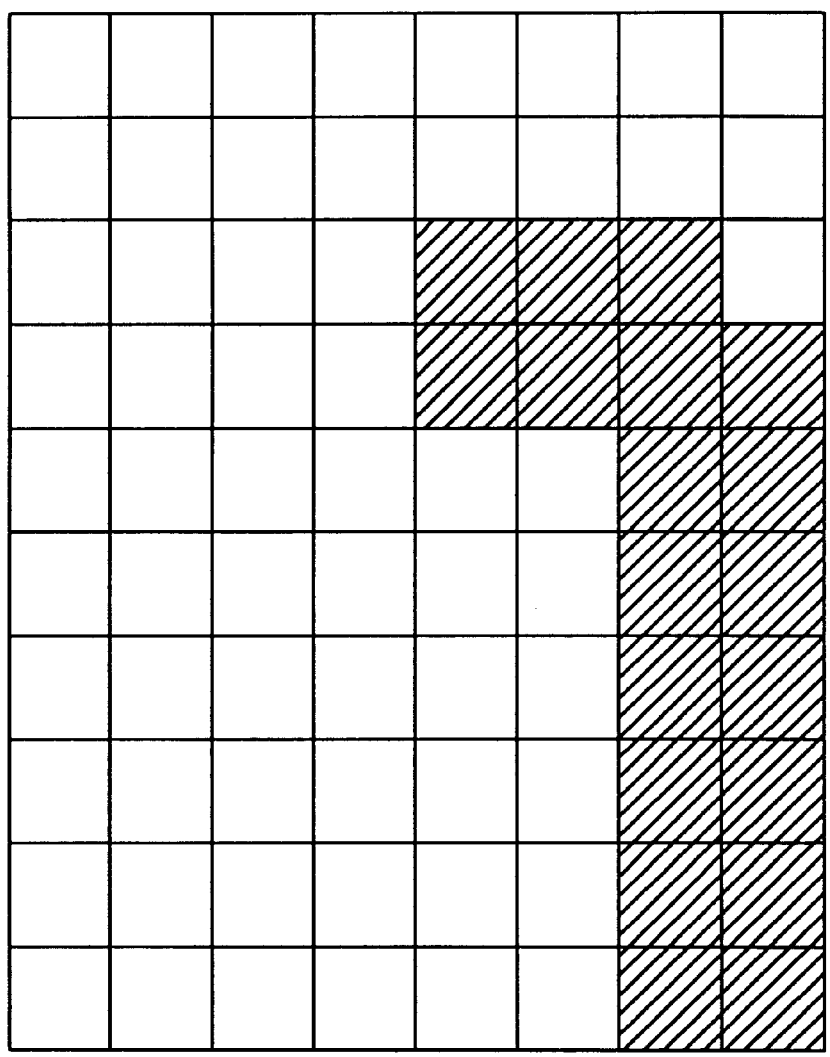
FIG. 15 illustrates the operation of the image processing device in the first embodiment of this invention.

As this processing is executed repeatedly, fine line processor 10 removes the fine lines from the image. When the image is sent to pattern extraction unit 20, only the pixels above the given threshold remain. The pattern which is extracted is that shown in FIG. 15. The pattern can be clearly distinguished even if the threshold value for binarization is set only roughly. All the fine lines have already been removed. Even if the density of the fine lines in the original image contrasted only slightly with that of the pixels in the specified pattern, all portions of the image occupied by lines have gone to 00 (white), resulting in a substantial difference in density (or contrast) between the portion of the image occupied by the pattern and the portion formerly occupied by the lines. By the same token, the pattern will be extracted reliably even if its density value varies slightly.

Once the pattern has been extracted in this way, it is transmitted to recognition processing (not pictured), where a determination is made as to whether this pattern is in fact the one which is to be detected. If it is that pattern, and the processing device is being used, for example, in a copier, the copying process is halted. If it is being used in an image input device such as a scanner, the reading process is halted. If it is being used in an image output device such as a printer, the output process is halted. With this embodiment, then, fine lines are added around a pattern in an image to make it blend in with its surroundings. These lines are removed before attempting to determine whether this is the specified pattern, so the pattern stands out from the background. This allows the aforesaid pattern to be recognized with higher accuracy. The pattern can also be extracted and recognized reliably when someone has tampered with the original document by drawing extra lines on it, as those lines will be removed before recognition processing is executed. The lines in question may actually be printed around the specified pattern, they may be part of a background or other pattern on a paper stock, or they may take some other form.

Figure 16:
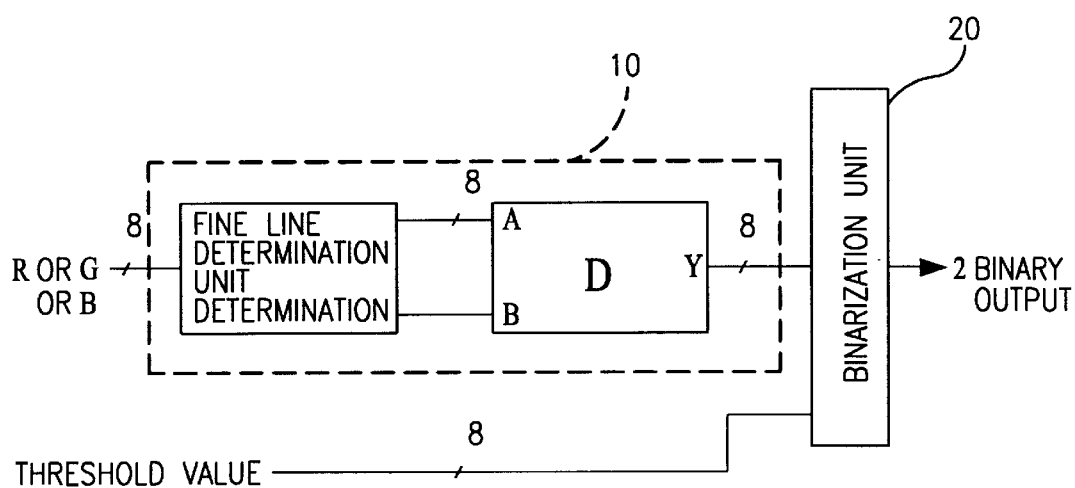
FIG. 16 is a block diagram of another version of the first embodiment.

In the embodiment we have been discussing, the specified pattern is manifest as data representing three colors, R, G and B. The invention, however, is not limited to this case only. If, for example, the specified pattern are defined as something of a given color (say, red), then line processor 10 and pattern extraction unit 20, which receives and binarizes the output of processor 10, could each suffice with only one unit, as shown in FIG. 16.

Figure 17:
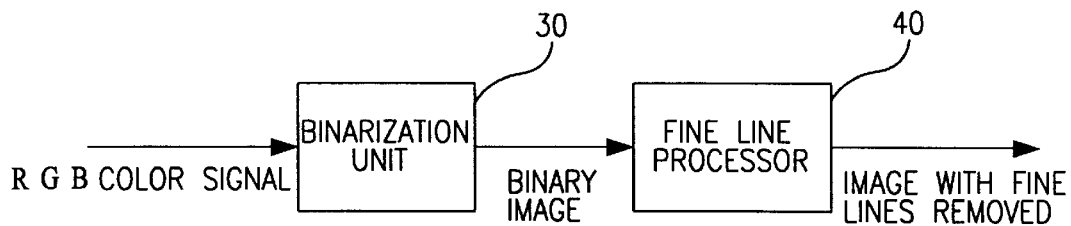
FIG. 17 shows the overall configuration of an image processing device in a second embodiment of this invention.

FIG. 17 shows our second ideal embodiment of this invention. In the first embodiment we discussed, a count is made of the pixels among the eight surrounding the object pixel which had a density value close to that of the object. Threshold processing is then used to determine whether the object pixel is part of a line. In this embodiment, the determination is made using pattern matching.

Here the 256-step density data for R, G and B which are obtained when the image is captured are transmitted to binarization unit 30. There they are binarized, generating a binary image which is sent to line processor 40. Line processor 40 uses pattern matching to determine whether the object pixel is part of a line. If it is, that pixel is output as white (0); if it is not, it is output as black (1). In other words, the determination and the removal are accomplished simultaneously.

Figure 18:
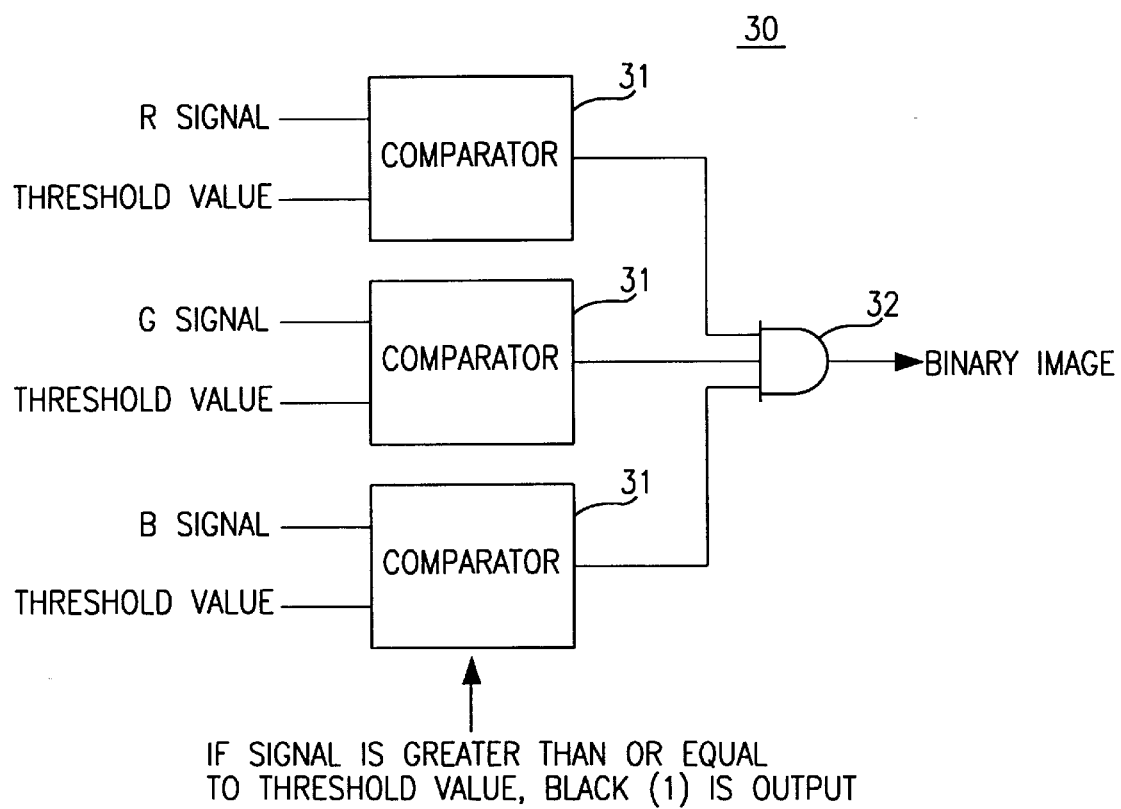
FIG. 18 shows the internal configuration of the binarizing device.

Specifically, binarization unit 30 executes threshold processing on each of the R, G and B data using comparators 31 shown in FIG. 18. The results of this threshold processing (binary data for each of R, G and B) are sent to AND circuit 32. Thus if all the R, G and B data are above the threshold, black (1) will be output just as in the first embodiment discussed above.

Figure 19:
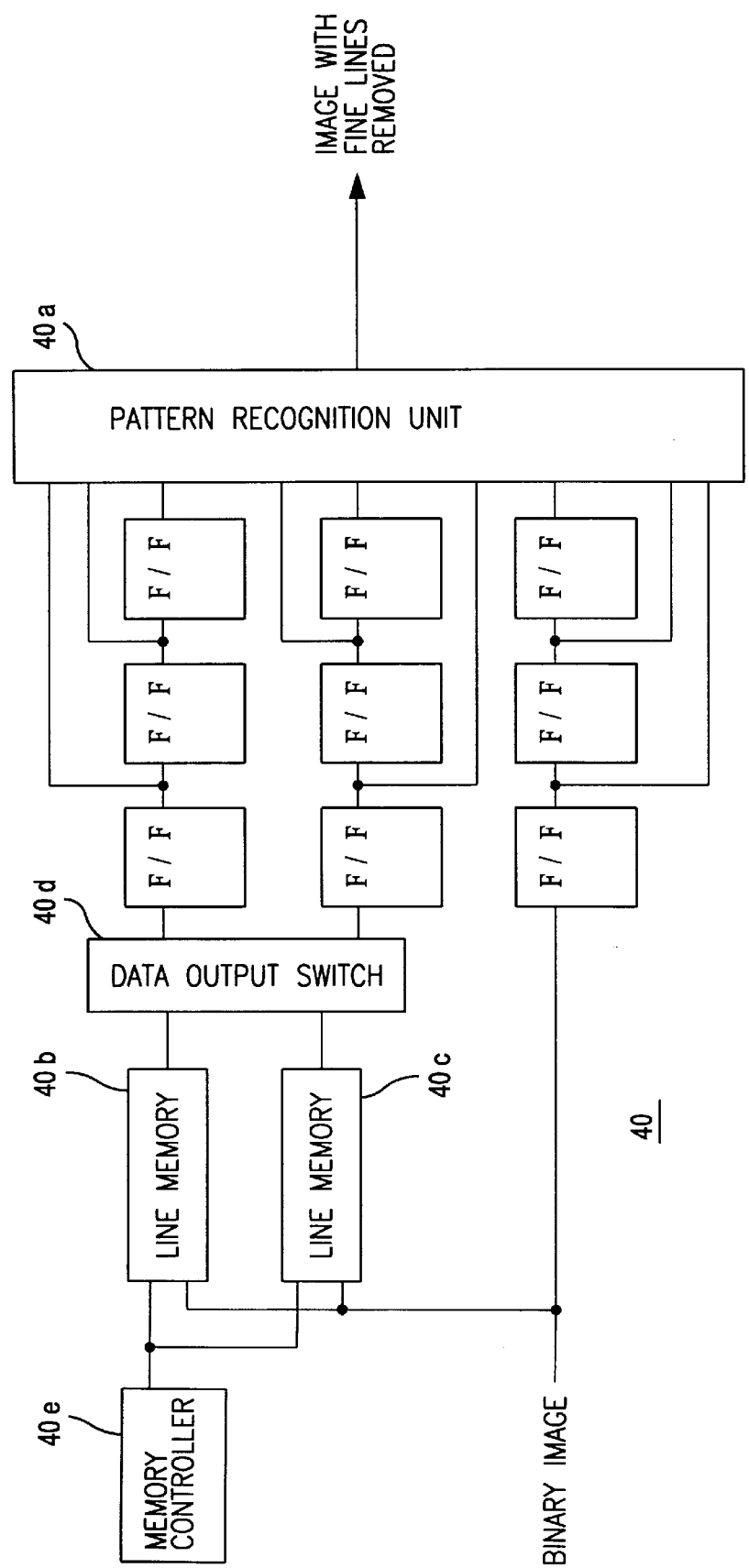
FIG. 19 shows the internal configuration of the fine line processor.

Line processor 40 has the hardware configuration pictured in FIG. 19. It is identical to the first embodiment shown in FIG. 4, except that it employs a pattern recognition unit 40a instead of determination unit 11a. Since the input image is already binary, the line memories and flip-flops used are specialized for binary data.

Figure 20:
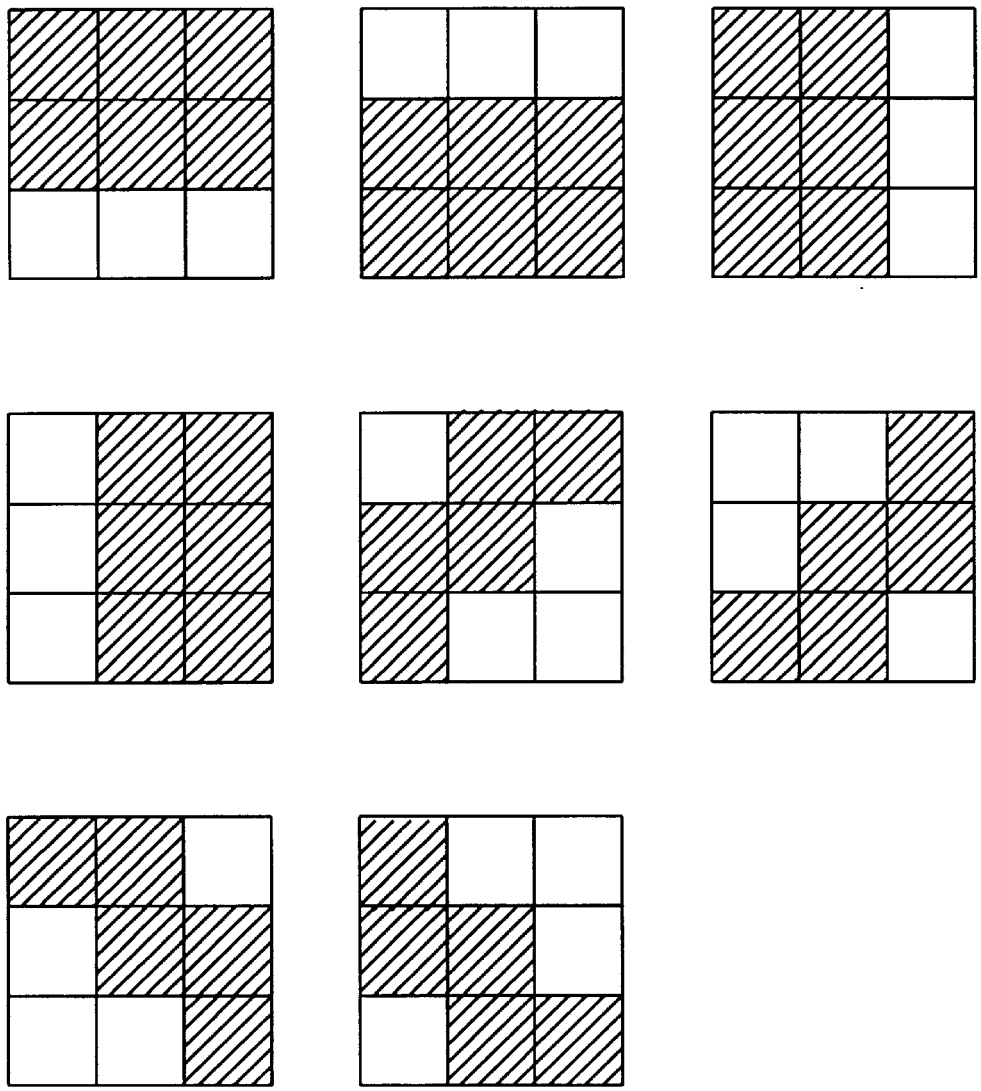
FIG. 20 shows an example of possible reference patterns.
Figure 20:
Figure 20:
Figure 21A:
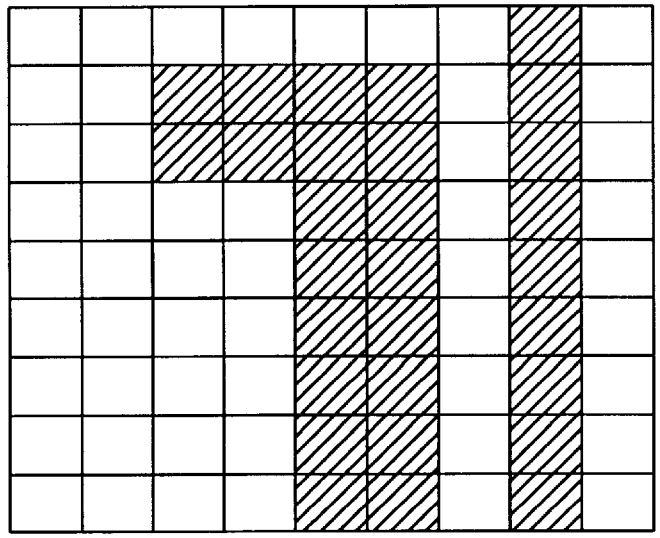
FIGS. 21(A) and 21(B) illustrate the operation of the image processing device in the second embodiment.
Figure 21B:
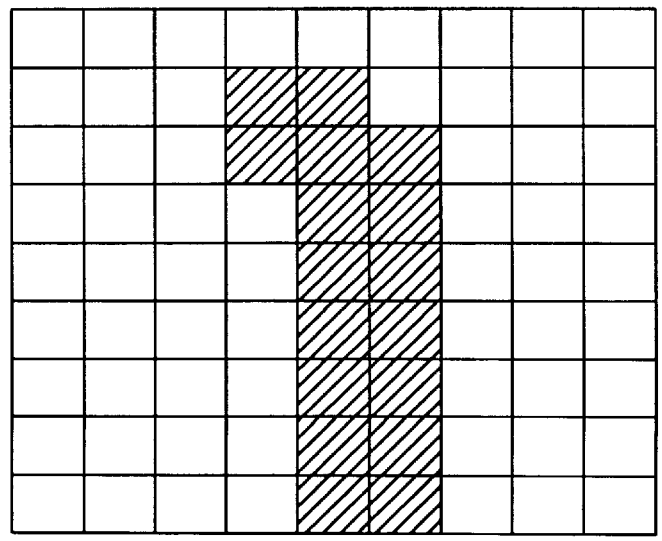

The pattern recognition unit 40a uses the eight reference patterns pictured in FIG. 20 as its knowledge base. It determines whether the 3×3 pixel pattern which it receives matches any of the reference patterns. If it does, the pixel is judged not to belong to a line, and is output as an unmodified black pixel. If it does not match any of the patterns, the pixel is judged to belong to a line, and is output as a white pixel. In this embodiment, then, pattern recognition unit 40a combines the functions of a determination device and a removal device. If, for example, the binary image in FIG. 21(A) are input, every center pixel in a 3×3 grid which did not match a reference pattern would go to 0, resulting in the pattern shown in FIG. 21(B), whose extraneous lines have been removed.

As we have explained, with the image processing device and method of this invention, fine lines are reliably removed from an image. Thus even if there are fine lines on the periphery of the specified pattern in the untreated image, the pattern can be extracted and made to stand out from the background. This allows the pattern recognition processing to be executed swiftly and accurately. Because fine lines along the border of the pattern in the untreated image will blend in with that pattern, the pattern itself will be more difficult to distinguish, making it more tamper-resistant.

With this invention, a number of images with different levels of contrast can be processed by a device with only one system. Even if the pattern contrasts only slightly with the surround, it will be extracted accurately.

What is claimed is:

1. An image processing device to detect a line segment of less than a given thickness in a set of an object image data by a fine line processor, said fine line processor comprising:
   a pixel processing device to extract a density value of an object pixel in said object image data and a plurality of density values of each adjacent pixels surrounding said object pixel, and, using said density value of said object pixel as a reference, to detect only a plurality of said adjacent pixels of which density are within a fixed range of said density value of said object pixel; and
   a judging device to count a number of said plurality of said adjacent pixels, and, based on whether said number is within a given value, to make a judgement whether said object pixel being processed is part of a line segment of less than a given thickness.

2. An image processing device according to claim 1, wherein said pixel processing device and said judging device have a number of discrete systems corresponding to a number of different colors.

3. An image processing device according to claim 2, further comprising a final determination unit to make a final determination as to whether said object pixel being processed is a part of said line segment of less than a given thickness based on an output of each of said number of discrete systems.

4. An image processing device according to claim 3, further comprising a line removal unit to remove said object pixel which has been determined to be part of said line segment of less than a given thickness based on said final determination.

5. An image processing device according to claim 4, further comprising a pattern extraction unit, connected to said line removal unit, to extract a specified pattern from said object image data by selecting said object pixel having a density over a threshold value.

6. An image processing device according to claim 1, further comprising a line removal unit to remove said object pixel which has been determined to be part of said line segment of less than a given thickness based on said judgement.

7. An image processing device according to claim 6, further comprising a pattern extraction unit, connected to said line removal unit, to extract a specified pattern from said object image data by selecting said object pixel having a density over a threshold value.

8. An image processing method using a fine line processor to detect a line segment of less than a given thickness in a set of an object image data, comprising:
   extracting a density value of an object pixel in said object image data and a plurality of density values of each adjacent pixels surrounding said object pixel, and, using said density value of said object pixel as a reference, detecting only a plurality of said adjacent pixels of which density are within a fixed range of said density value of said object pixel by a pixel processing device; and
   counting a number of said plurality of said adjacent pixels, and, based on whether said number is within a given value, making a judgement whether said object pixel being processed is part of a line segment of less than a given thickness by a judging device.

9. An image processing method according to claim 8, wherein said image processing method is executed for a plurality of colors.

10. An image processing method according to claim 9, further comprising a step of making a final determination as to whether said object pixel being processed is part of said line segment of less than a given thickness based on said judgement for an individual color in said plurality of colors.

11. An image processing method according to claim 9, further comprising a step of making a final determination as to whether said object pixel being processed is part of said line segment of less than a given thickness based on said judgement of said plurality of colors.

12. An image processing method according to claim 11, further comprising a step of removing said object pixel which has been determined to be part of said line segment of less than a given thickness based on said final determination by a line removal unit.

13. An image processing method according to claim 12, further comprising a step of extracting a specified pattern from said object image data by selecting said object pixel having a density over a threshold value by a pattern extraction unit connected to said line removal unit.

* * * * *